Patented Jan. 20, 1942

2,270,520

UNITED STATES PATENT OFFICE 2,270,520

PROCESS FOR IMPROVING MATERIALS CONTAINING CELLULOSE

Charles Graenacher, Riehen, and Richard Sallmann, Bottmingen, Switzerland, assignors to firm of Society of Chemical Industry in Basle, Basel, Switzerland No Drawing. Application April 29, 1939, Serial No. 270,918. In Switzerland May 5, 1938

6 Claims. (Cl. 8—46)

This invention relates to improving cellulose or materials containing cellulose by treating the material with a carboxylic acid methylolamide in which the carbonyl group is attached to an active residue free from basic nitrogen atoms by a carbon to carbon linkage, heating the thus treated material and if desired subjecting the active residue of the carboxylic acid methylolamide to a further reaction. This optional reaction of the said residue may alternatively be brought about before the carboxylic acid methylolamide is used for treating the cellulose or the material containing cellulose provided that a conversion with dyestuff components is to be brought about.

As carboxylic acid methylolamides in which the carbonyl group is bound to a reactive residue by a carbon to carbon linkage there come into question for example methylolamides of aliphatic, aromatic, mixed aliphatic-aromatic, cycloaliphatic or heterocyclic carboxylic acids which contain at least two carbon atoms linked together and at least one reactive group. As active groups the carboxylic acids from which the methylolamides are derived may contain reactive atoms, for instance halogen atoms, hydrogen atoms capable of exchange or reactive atom groups free from basic nitrogen atoms, for example hydroxy groups or acid groups, for instance carboxyl-, sulfonic acid or sulfuric acid ester-groups and salts thereof. Such carboxylic acid methylolamides are for instance methylolchloracetamide, $\beta$-chloropropionic acid methylolamide, $\alpha$-bromopropionic acid, $\alpha$-bromo-butyric acid methylolamide, $\alpha$-bromolauric acid methylolamide, chloro-succinic acid dimethylolamide, para-chloromethylmethylolbenzamide, methylolamides of naphthenic acids and resin acids which contain halogen atoms capable of exchange also salicylic acid methylolamide, methylolamides of hydroxynaphthoic acids, and N-methylol-meta-sulfobenzamide. Salicylic acid methylolamide and the methylolamides of hydroxynaphthoic acids contain a hydroxyaryl residue, as is known. There may also be used N-methylol derivatives of dicarboxylic acid-semi-amides, for example the semi-amides of phthalic acid, hexahydrophthalic acid, naphthalic acid, quinolinic acid, maleic acid, adipic acid or sulfophthalic acid.

Carboxylic acid methylolamides in which the reactive group has undergone a conversion before the reaction on the cellulose are for example conversion products with dyestuff components.

The carboxylic acid methylolamides used in the invention are either known or may be made without further direction by processes analogous to the known processes for making such compounds.

The action of the carboxylic acid methylolamides on the cellulose or material containing cellulose may be effected with advantage by impregnation of the material to be treated with a solution or dispersion of methylolamide advantageously in presence of a catalyst such as dilute acid or an acid salt, and subsequent treatment at a raised temperature. As solvent or dispersing agents water is particularly useful especially for the methylolamides of low molecular weight. However there may also be used organic solvents, pyridine, dimethylaniline, dioxane or the like. Dispersions for the purpose may be made by known methods.

As acid catalysts there may be used for instance formic acid, acetic acid, oxalic acid, urea nitrate, potassium-bisulfate, lactic acid, glycollic acid. It may be of advantage to add formaldehyde to the treating bath.

It is further possible to produce the methylolamide during the treatment of the cellulose material by using a treating bath which contains the carboxylamide and formaldehyde, as well as, if desired, a catalyst such as a weak acid. The cellulose material which has been impregnated with the solution or dispersion of the methylolamide is then optionally dried at a low temperature and afterwards heated to a high temperature of for instance 110° C.

After the treatment with methylolamide the cellulose or cellulosic material may be subjected to the reaction which is to change the reactive group present in the methylolamide used, for example a halogen atom or a sulfuric acid ester group.

Another procedure consists in treating the cellulose with a methylol compound in which the conversion of the reactive group to form dyestuffs has already occurred at some suitable stage in the production of the methylol compound.

The reactive group which is present in the methylolamides to be used in the invention may be caused to react with the formation of a dyestuff. Thus it is possible to couple with a diazonium compound cellulose which has been treated in the prescribed manner with a carboxylic acid methylolamide capable of such coupling, for example salicylic acid methylolamide or a methylolamide of an hydroxynaphthoic acid, dyeings which are fast to washing being thus obtained. Hydroxy-azo-dyestuffs obtained by coupling salicylic acid amide with suitable diazonium compounds are called hereinafter hydroxy-azo-dyestuffs of the salicylic acid series.

Instead of by coupling, dyestuffs may also be obtained by reaction with reactive dyestuffs, for instance hydroxyazo-dyestuffs of the benzene series or amino-anthraquinones, for example 1:4 - di -(para - aminophenyl) - aminoanthraquinone. For this reaction methylolamides of halogen carboxylic acids, for instance chloroacetic acids are particularly suitable. The reaction with the reactive dyestuff may precede or follow the action of the methylolamide on the cellulose or material containing cellulose.

In the present process a chemical reaction between the cellulose and the carboxylic acid methylolamide group of the compounds applied takes place in all probability during the heating operation. It is therefore to be assumed that for example in the colored cellulose materials obtainable according to the present process the dyestuff is fixed onto the cellulose with aid of the carboxylic acid methylolamide group.

As cellulose or material containing cellulose there may be used for example cotton, viscose artificial silk, copper artificial silk, paper, mixtures of cellulose with other fibers such as wool, for example in the form of threads or fabrics. It is frequently of advantage first to subject the material to be treated to a cleansing operation or to de-size the fibers or fabric.

The following example illustrates the invention:

Example 1

Cotton is impregnated with a solution of 10 per cent strength of N-hydroxymethyl salicylic acid amide containing 0.3–0.5 per cent of formic acid for 15 minutes at 40–50° C. then squeezed, dried at 50–60° C. and heated for 4 hours at 110–115° C. After washing with boiling hot water and drying the material may be dyed fast to washing by treatment with a diazo compound, for instance diazotized aniline or diazotized 1-amino-2-methoxy-4-nitrobenzene.

A similar result is obtained if instead of the N-hydroxymethyl salicyclic acid amide as parent material the methylolamide of the para-hydroxybenzoic acid is used.

What we claim is:

1. A process for improving materials containing cellulose which comprises treating the materials with a hydroxyaryl carboxylic acid methylolamide, heating the thus treated materials and further treating them with a diazonium compound capable of coupling with the hydroxyaryl carboxylic acid methylolamide.

2. A process for improving materials containing cellulose which comprises treating the materials with N-hydroxymethyl salicylic acid amide, heating the thus treated materials and further treating them with a diazonium compound capable of coupling with the N-hydroxymethyl salicylic acid amide.

3. A process for improving materials containing cellulose which comprises treating the materials with N-hydroxymethyl salicylic acid amide, heating the thus treated materials and further treating them with diazotized 1-amino-2-methoxy-4-nitrobenzene.

4. Cellulose materials dyed with a hydroxyazo-dyestuff which contains a hydroxyaryl carboxylic acid methylolamide group and which is fixed by a reaction of the hydroxyaryl carboxylic acid methylolamide group with the cellulose materials during heating the cellulose materials treated with a hydroxyaryl carboxylic acid methylolamide before developing the hydroxyazo-dyestuff by treating with a diazonium compound capable of coupling with the hydroxyaryl carboxylic acid methylol amide.

5. Cellulose materials dyed with a hydroxy-azo-dyestuff of the salicylic acid series which contains a N-hydroxymethyl salicylic acid amide group and which is fixed by a reaction of the carboxylic acid methylolamide group of the N-hydroxymethyl salicylic acid with the cellulose materials during heating the cellulose materials treated with the N-hydroxymethyl salicylic acid amide before developing the hydroxyazodyestuff by treating with a diazonium compound capable of coupling with the N-hydroxymethyl salicylic acid amide.

6. Cellulose materials dyed with the hydroxy-azo-dyestuff from salicylic acid methylol amide and diazotized 1-amino-2-methoxy-4-nitrobenzene which is fixed by a reaction of the carboxylic acid methylolamide group of the salicylic acid methylol·amide with the cellulose materials during heating the cellulose materials treated with the N-hydroxymethyl salicylic acid amide before developing the hydroxy-azo-dyestuff by treating with diazotized 1-amino-2-methoxy-4-nitrobenzene.

CHARLES GRAENACHER.
RICHARD SALLMANN.